Sept. 17, 1929.　　　J. W. WYLAND　　　1,728,463
EGG SIZING MACHINE BY WEIGHT
Filed Sept. 17, 1927　　　3 Sheets-Sheet 2
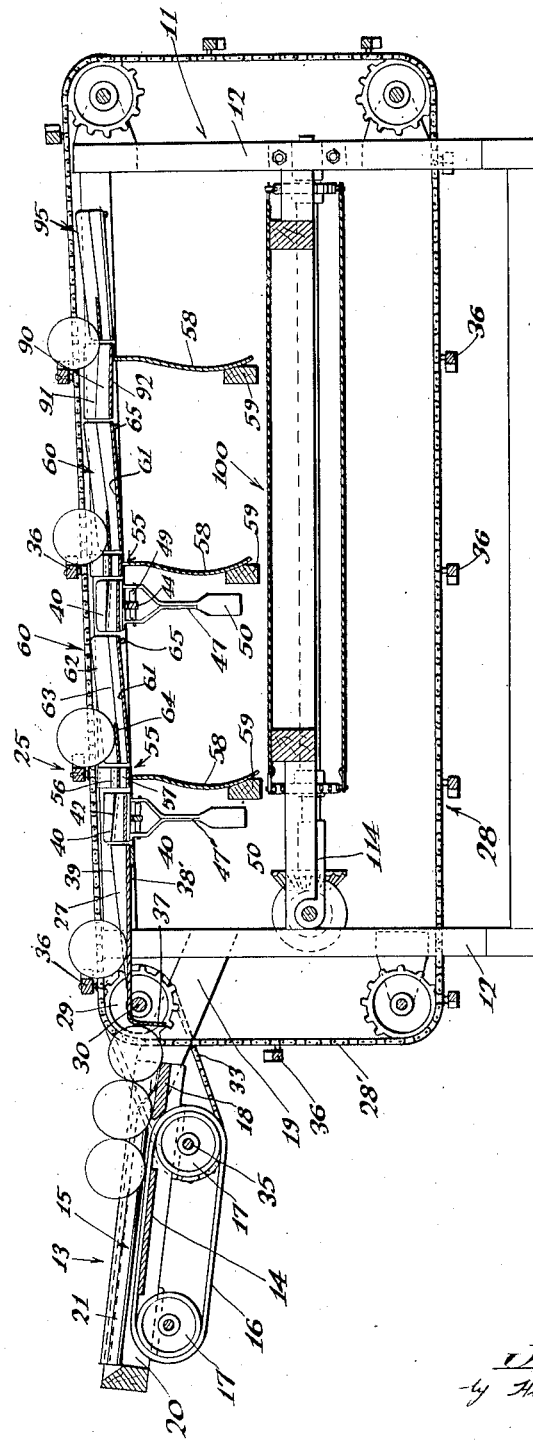
Inventor
J. W. Wyland
by Hazard and Miller
Attorneys Sept. 17, 1929.   J. W. WYLAND   1,728,463
EGG SIZING MACHINE BY WEIGHT
Filed Sept. 17, 1927   3 Sheets-Sheet 3
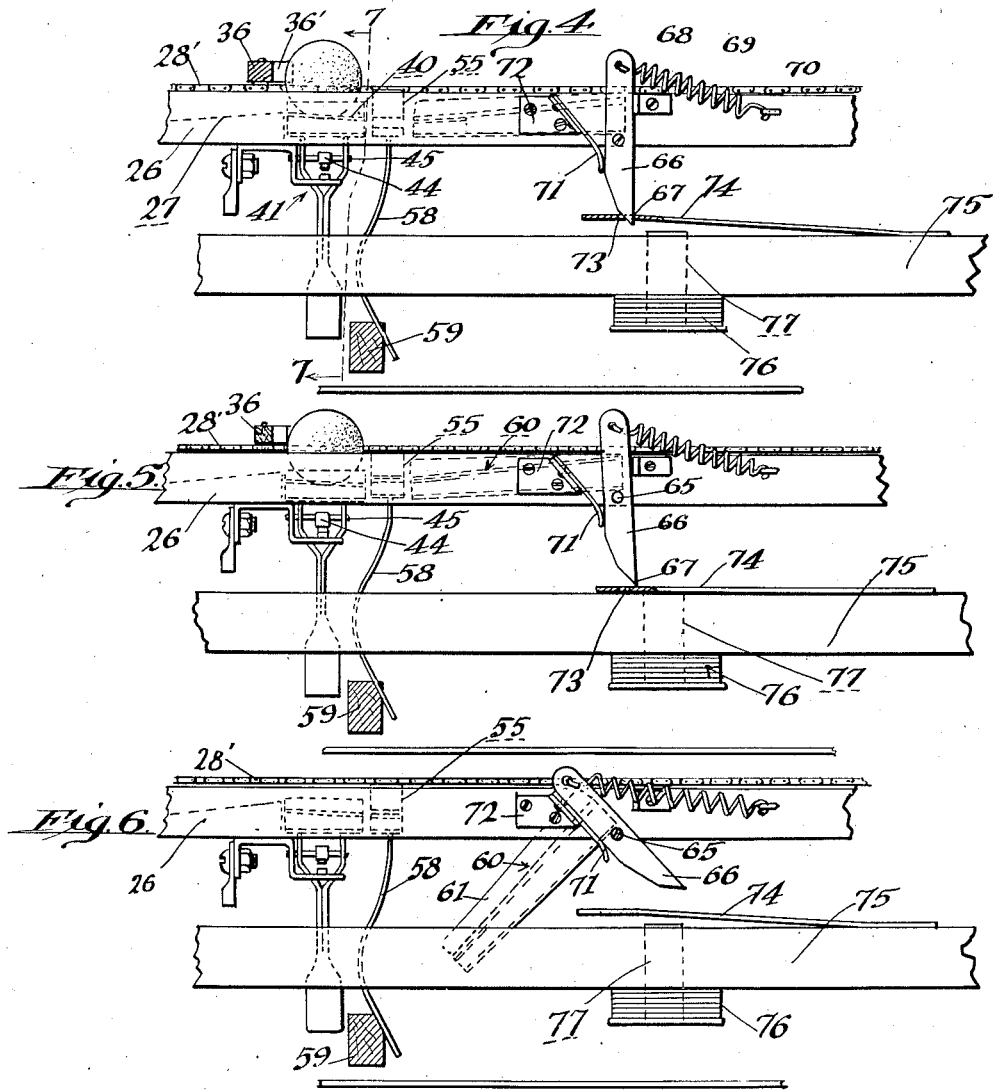
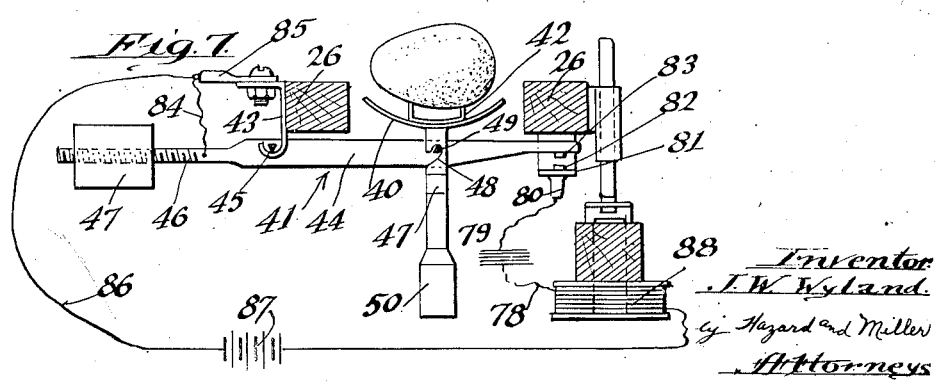

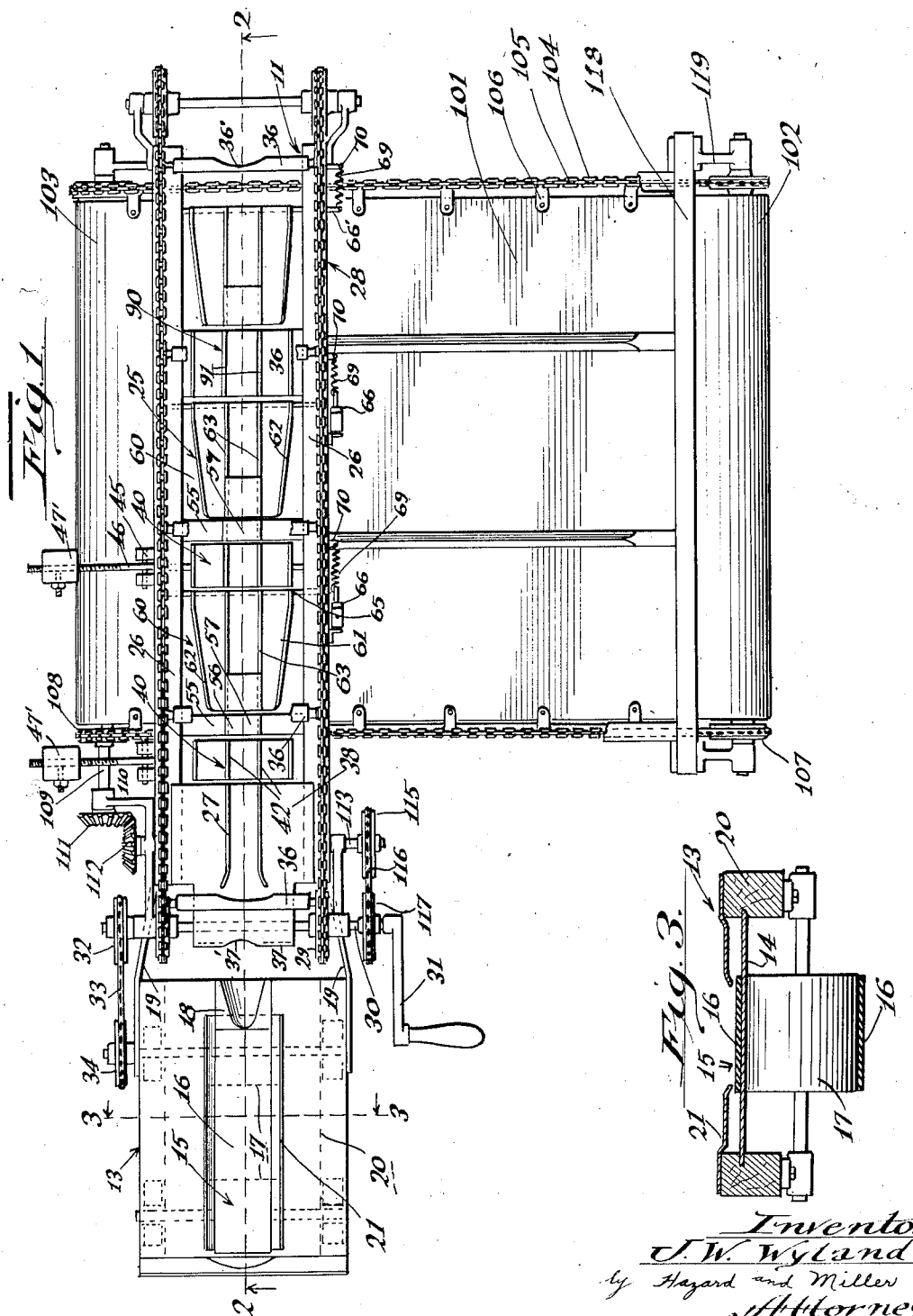

UNITED STATES PATENT OFFICE

JOHN W. WYLAND, OF SAN GABRIEL, CALIFORNIA

EGG-SIZING MACHINE BY WEIGHT

Application filed September 17, 1927. Serial No. 220,177.

My invention is an egg sizing machine by weight, that is, the machine weighs the eggs automatically and assorts them in accordance with the different weights.

The purpose of this invention is to sort eggs by weighing them, into two or more groups, in such manner that all the eggs in each group will fall between a certain approximate weight, that is, there will be a certain minimum and a certain maximum for each group. In this manner the eggs may be sorted so that a dozen eggs will run a weight between a predetermined maximum and a predetermined minimum. In some States it is required by law that eggs be sold in effect by weight, that is, if they are sold by the dozen, eggs of a certain grade must conform to a certain weight between a predetermined maximum and a predetermined minimum; and eggs of another grade be of another weight between the maximum and the minimum. Where this is not the law, it is pretty much the custom of the trade that eggs should be sorted in this manner. However, this is generally done by sizing the eggs and not determining the group in which they belong by actual weighing.

The lightest group of eggs is known as the pewee size and the eggs under a fixed weight per dozen are designated as pertaining to this size. The other grades or sizes have different names in different localities.

An object, therefore, of my invention is the construction of a machine and method of sorting eggs in the above manner by weight. To effect this end, the eggs are preferably fed by an endless conveyor from a feeding table onto a sorting or weighing table. This weighing table has a slightly upward inclination, there being tracks on which the eggs may roll with their long diameter normal to the direction of travel. An endless conveyor has slats for moving the eggs, and at different positions lengthwise of the table there are weighing scales.

These scales are constructed so that the heaviest eggs are sorted out first, the next lighter grade on the next weighing scale, and so on, the lightest eggs being the last to be sorted. Each of the weighing scales is provided with an electric make and break device which, when the scale is depressed, establishes a circuit. On the table following each weighing scale there is a drop panel which is pivotally mounted, this panel being retained in its elevated position by a trigger and a sear device so that the trigger is released on the operation of the scale immediately preceding the panel; hence, when the egg rolls on the panel, its weight actuates the panel, dropping the egg into a receptacle.

After the egg has been dropped, the panel is automatically returned to its normal position by a spring or other suitable mechanism. The receptacles in which the eggs are dumped have endless belts running crosswise to the weighing table so that the eggs, on being dumped through the panels, are moved out of the way of succeeding eggs. The endless belts bring the eggs to rest against a side frame and they may then be packed by hand into shipping crates or the like. The eggs, after being sorted by each scale and dropped through the panels, are maintained separate by any suitable arrangement.

Another object of my invention is the construction of a weighing scale for eggs, the platform of the scale being pivotally connected to the beam of the scale so that it is immaterial as to whether the large end or the small end is nearest to the fulcrum point of the beam.

Another feature of my invention is in allowing the eggs to roll ahead of the moving slats of the conveyor at the instant of being weighed so that the conveyor does not in any manner influence the weighing scale.

My invention also comprehends the method of sizing eggs by weight involving the features hereunder set forth.

My invention will be more readily understood from the following description and drawings, in which:

Figure 1 is a plan view of my machine.

Figure 2 is a longitudinal section taken on the line 2—2 of Fig. 1 in the direction of the arrows.

Figure 3 is a transverse vertical section on the line 3—3 of Fig. 1 in the direction of the arrows through the infeeding conveyor.

Figure 4 is a fragmentary side elevation on an enlarged scale, illustrating the operation of the dumping panel by the weighing scale. This figure illustrated the dumping panel in the normal upper position.

Figure 5 is a view similar to Fig. 4 showing the trigger released from the sear by the electrical mechanism.

Figure 6 is a view similar to Fig. 4 showing an egg being dropped by the dumping panel.

Figure 7 is a detail transverse vertical section on the line 7—7 of Fig. 4 illustrating the weighing scale.

The general features of my invention comprise a suitable frame-work 11 which has legs 12 at each end. A feeding in table 13 is constructed having a plate 14, over which the upper run 15 of an endless belt 16 passes, this belt operating over rollers 17 mounted on the feeding table. A bridging board 18 extends from the belt to a position adjacent the main part of the machine. This feeding table is preferably supported by brackets 19 from the frame 11.

In order to properly guide the eggs on the infeeding table, this table is provided with side bars 20 in which the plate 14 is secured, and with guide strips 21, preferably of metal. The discharge end is formed with a molded surface 22, this construction being adapted to turn the eggs so that their long axis is normal to the direction of travel.

The main sizing table, designated generally by the numeral 25, is provided with side rails 26 on each side and at the center with a pair of tracks 27, these tracks being to roll the eggs thereon. It will be noted by the section of Fig. 2 that the rails 26 have a constant slope upwardly, whereas the tracks 27 are broken at the weighing scales and dumping panels hereunder described. An endless conveyor 28 is provided with chains 28', the upper run of which may slide on the rails 26; these chains pass over a driving sprocket wheel 29 which is mounted on a shaft 30, this shaft having a crank 31. The drive is conveyed from the shaft 30 by means of a sprocket gear 32, a sprocket chain 33 and a sprocket gear 34 which actuates the shaft 35 having one of the rollers 17 of the feeding table thereon. In this manner the conveyor 28 and the belt conveyor 16 are actuated in synchronism.

The chains 28' are connected by slats or bars 36 which, at the end of the feeding table, engage the eggs, lifting them upwardly adjacent the flange 37 of a plate 38 mounted on the infeeding end of the sizing table. When the eggs are on the tracks 27, these slats carry them in a forward direction.

The first movement of the eggs on the sizing machine is up the inclined portion of the track 39, and onto the platform 40 of the first weighing scale 41, these platforms having tracks 42 in alignment with the tracks 27. A characteristic feature of my invention is that the tracks 42 have a slightly downward inclination from the horizontal, as shown particularly in Fig. 4, whereas the tracks 27 preferably have a slightly upward inclination. This causes the eggs to roll slightly ahead of the slats 36 when the eggs pass onto the platform of the weighing scales, and thus space the eggs slightly from these slats so that the eggs are uninfluenced by the conveying mechanism while being weighed.

The weighing scales are constructed substantially as follows having reference particularly to Figs. 4 and 7: On one of the rails 26 there is secured a bracket 43 on which is pivotally supported the beam 44 of the scale, the beam having a fulcrum 45 with a sharpened edge engaging the bracket. The beam has a threaded end 46 with an adjusting weight 47 thereon.

The platform 40 has an arm 47 extending downwardly therefrom, this arm having a notch 48, and being mounted on pivot pins 49 on the beam 44. The lower end of the arm has a counterweight 50 to maintain the arm normally in a vertical position, with the tracks 42 in proper alignment with the fixed tracks 27. The pivotal point 49 is preferably made in the platform of a weighing balance fulcrum, being three-cornered with the sharp edge supporting the arm 47. By this construction it is immaterial as to whether the heavy or large end of the egg is near or far from the fulcrum 45. It is obvious that if the platform 40 were rigid with the scale beam 44, if the heavy end of the egg were towards the fulcrum and the light end furthest from the fulcrum, it would give a different actuation of the beam than when the egg would be reversed, with the heavy end furthest from the fulcrum and the light end nearest the fulcrum. Therefore, my construction of the mounting of the platform on the beam compensates for the eggs being placed in different positions. The combined weight of the platform 40, the egg, the arm 47 and the counter-weight 50 pass through the pivot point 49, thus the operation of the weighing beam is constant.

Immediately following each weighing scale on the sizing table there is a bridging piece 55 which has tracks 56 thereon, and also a plate 57. The top of the rails and the bottom plate 57 are positioned at such an elevation that when the scale is depressed, the egg may be readily pressed onto this bridging section by the movement of the slats 36. Extending below the bridging section there is a partition 58 which is secured at the lower end to a cross bar 59.

The egg in its next movement along the sizing table is pushed by the slats off the bridging section onto a dumping panel designated generally by the numeral 60. Each of the panels following the weighing scale is constructed alike, having reference particularly to Figs. 4, 5 and 6. Each of the panels has a plate 61 turned up on each edge 62. Tracks 63 are supported on the plate and between the tracks there is a bearing plate 64 receiving the egg immediately after discharge from the bridging section. The panel is mounted on a pivot pin 65 which extends between the rails 26 and allows dumping of the panel. The tracks on the panel have an upward inclination when the panel is in its normal upward position so that eggs which are too light to dump the panel are on an upward grade before passing onto the next weighing scale.

The tripping mechanism for the panels is substantially as follows, having reference particularly to Figs. 4 through 7:

Rigidly secured to the pivot pin 65 there is a trigger 66, the lower end of which has a point 67 and the upper end 68 is engaged by a tension spring 69 secured to such upper end and to a hook 70 in one of the side rails 26. The trigger is preferably outside of the side rail. A spring bumper 71 is secured to a bracket 72 which is attached to one of the side rails, this spring pressing against the trigger, as shown in Fig. 4. The panel is held in its upper position by the trigger engaging in an aperture 73 in the sear 74, this latter being formed of a strip of metal secured to the longitudinal rail 75 of the frame of the machine.

An electro-magnetic device 76 is also secured to the frame and has a core 77, this device when energized attracting the sear 74 which acts as an armature. The electric circuit from the electro-magnet has a lead 78 through a condenser 79 to a terminal 80 on a bracket 81 depending from one of the side rails 26. A fixed contact 82 is secured to this bracket and in the electrical connection with the terminal 80. A movable contact 83 is secured to the outer end of the arm 44 of the weighing scale. This arm forms a conducting element and has a lead 84 attached thereto, this lead extending to a terminal 85 secured to one of the side rails 26. The circuit is completed by a lead 86 through a source of power such as a battery 87 and to the winding 88 of the electro-magnet.

The operation of the dumping panel is substantially as follows:

This panel is normally held in the position shown in Fig. 4 as above mentioned, by the trigger 66 engaging in the aperture in the sear 74. When the scale is depressed by an egg of sufficient weight, the contacts 82 and 83 are brought into engagement and establish a circuit through the electro-magnet which becomes energized and attracts the sear 74, this being the armature of the electro-magnet. This action disengages the point of the trigger from the opening 73 and allows the bumper 71 to shift the trigger and the panel slightly into the position shown in Fig. 5, and when in this position, the egg is still on the scale so that the magnet is energized.

As soon as the egg passes onto the bridging section, the magnet is de-energized and the sear would normally move upwardly, but is held down by the point 67 of the trigger 66. When in this condition the spring 69 and the bumper springs 71 substantially equalize each other. The next stage of the operation is caused by the egg rolling from the bridging section onto the dumping panel. At each dumping panel, the bridging plate 64 is slightly concave downwardly to conform somewhat to the shape of the egg and is of sufficient height so that the egg dropping from the bridging section onto the end of the panel will not strike the rails, as these might cut through the shell of the egg. When the egg is fully on the dropping panel, this swings downwardly as shown in Fig. 6, due to the weight of the egg, over-balancing the tensioning of the spring 69. The partition 58 prevents the egg from touching any part of the weighing scale and also guides the egg in rolling off of the upper surface of the panel.

If eggs are too light to be dumped by the dumping panels connected to the first weighing scale, they are carried on to the next. This separates another group of eggs which are lighter in weight than the first group. There may be as many of these scales and dropping panels connected therewith as are needed to sort the eggs into different grades. For the sake of simplicity, however, I only show two weighing scales and two dumping panels connected therewith. At the upper end of the last dumping panel connected to a scale, there is a further bridging section 90 of the sizing table. This has track sections 91 thereon and also has a bottom plate 92. One of the partitions 58 extends downwardly from this section.

The last dumping panel is constructed substantially the same as the other dumping panels except that it has an upwardly extending post 66' of the same shape as the upper part of the trigger 66 and has a spring 69 connected to the hook or the like 70. For this last panel I may use a bumper spring 71 if it is found desirable to prevent the back slap of the panel, otherwise this is unnecessary. The slats 36 are provided with concave notches 36' which aid in centering the eggs in their movement along the machine and hence in guiding eggs properly onto the dumping panels. The tension spring of this last panel is such that when the smallest eggs roll thereon, the panel tilts and drops the eggs.

A feature of the return movement of each of the panels is that the bumper 71 catches the trigger on its return movement and thereby takes the shock of the upwardly swinging movement caused by the spring 69.

The egg receiving receptacle designated generally by the numeral 100 comprises an endless apron 101 which operates over rollers 102 and 103, these rollers being mounted in a frame 104 which extends transversely across the frame 11. The apron 101 preferably is attached to side chains 105 by securing tabs 106. The apron is preferably padded and does not take any strain of the drive, this being carried by the chains operating over sprockets 107 and 108. This latter sprocket and the roll 103 are mounted on a shaft 109 which has an outer journal on a bracket 110 and carries a beveled gear 111 which meshes with a beveled gear 112 on a cross shaft 113; this latter being supported by suitable frame arms 114. The shaft 113 has a sprocket gear 115 and carries a sprocket chain 116 which takes over a sprocket 117 on the crank shaft 30. Therefore, by means of the crank shaft 30, the belts 16, the endless conveyor 28 and the apron 101 are driven. It is preferable to have the speed of the belt 16 slightly higher than that of the movement of the slats 36 so that the eggs will accumulate against the flange 37 of the plate 38. This forces the eggs into a position with their long axes normal to the direction of travel. The speed of the endless apron 101 is sufficient to keep eggs dumped thereon clear of succeeding eggs which are dumped, and thereby prevent breakage. The eggs in being carried sidewise on the apron 101 are prevented from intermingling by the bars 59 and the lower edge of the partition 58. The eggs come to rest against the barrier 118 secured by arms 119 to the outer end of the frame carrying the transverse operating apron.

It will thus be seen that I have developed a comprehensive machine which moves and sorts eggs into groups in accordance with their weight, and there may be as many groups as desired. The last group being composed of light-weight small eggs. The machine thus sorts or grades the eggs independent of size, but as the weight conforms pretty much to the size of the eggs, it also, in effect, sorts them more or less to size.

The eggs are carefully dropped by the dropping panels and the sorted eggs are shifted laterally, preventing breakage from succeeding eggs.

Another feature of my invention of importance is that the flange 37 of the plate 38 has a vertical concave section 37' facing towards the infeeding table, this flange and the top of the plate being padded to prevent breakage of eggs. The molded surface 22 is also concave facing upwardly and widens slightly towards the end. Therefore, when the eggs are pressed forward by the upper run 15 of the endless belt 16, when the leading egg rolls into the concave portion 37' of the flange 37, it ceases rotation on account of being off the belt 16; but the eggs on the belt 16 continue rotating and exert a pressure against the leading egg. This causes the leading egg and those following it to occupy a position with their long axis normal to the direction of travel. Hence all the eggs get stacked in this position some having the heavy end at one side of the machine and others with the heavy end at the other side of the machine, but this is immaterial. The leading egg is held in this position until a slat moving upwardly on the vertical portion of the conveyor 28 engages it and shifts it up onto the plate 38 and thence on to the rolls 39.

While I have defined my device as being used for grading or sizing eggs by weight, and in the claims I designate the apparatus as having various characteristics for handling eggs, it is nevertheless to be understood that my mechanism may be utilized for a number of different procedures such as grading fruit, vegetables and other products in which it is desired to make a grading by weight. In the claims I use the term egg for simplicity of nomenclature.

Various changes may be made in the principles of my invention without departing from the spirit thereof, as set forth in the description, drawings and claims.

I claim:

1. In the art described, a structure, means to move eggs therealong, one by one, a scale on which the eggs may be moved, a dropping panel separate from the scale, and means interconnected between the scale and the dropping panel to drop an egg therethrough if of sufficient weight to actuate the scale.

2. In the art described, the combination of a sizing table having means to move eggs therealong, one by one, a weighing scale on which the eggs may be moved one by one, a dropping panel, means interconnecting the scale and the dropping panel to drop an egg after passing off the scale should the egg be of sufficient weight to actuate the scale, and a second dropping panel to drop eggs independent of a weighing scale.

3. In the art described, the combination of a sizing table having a weighing scale, said table being constructed to move eggs therealong, a dropping panel separate from the scale positioned adjacent the scale, and an electro-mechanical means actuated by the scale to control the movement of the panel to drop an egg only when of sufficient weight to actuate the scale.

4. In the art described, a sizing table having a weighing scale and a drop panel adjacent the scale, a conveyor to move eggs one by one along the sizing table and over the scale, means to separate the eggs from the conveyor at the scale, and interconnecting means between the scale and the panel to drop an egg only when of sufficient weight to actuate the scale.

5. In the art described, the combination of a sizing table having a weighing scale and a dropping panel adjacent thereto, an inclined pathway leading to the weighing scale, a conveyor to engage eggs and move same one by one on said pathway, a downwardly inclined path at the scale, said path allowing an egg to roll ahead of the conveyor on the scale, and means interconnecting the scale and the dropping panel to drop an egg only when of sufficient weight to actuate the scale.

6. In the art described, a sizing table having a weighing scale with a platform and a weighing beam, a pivotally mounted dropping panel adjacent the scale, a trigger connected to the panel, a sear to retain the trigger in locked position with the panel to receive eggs passing from the scale to the panel, an electro-magnetic device to actuate the sear and an electric circuit through the electro-magnetic device actuated by the beam when an egg of sufficient weight passes thereon, the electro-magnetic device operating the sear to release the trigger and allow dropping of the panel by the weight of an egg.

7. In the art described, the combination of a sizing table having an inclined track, a plurality of weighing scales positioned across the track and a plurality of dumping panels, and means interconnecting some of the panels with an adjacent weighing scale to actuate such panel on the passage of eggs sufficient to operate the scales, there being an end panel operated by the weight of an egg.

8. In the art described, a sizing table, an infeeding table connected thereto, means to move eggs on said table, said means forcing the eggs into a position with their long axes normal to the direction of travel, a weighing scale, a dropping panel, means interconnecting the scale and the panel to allow actuation of the panel by the weight of an egg, if such egg is sufficient to actuate the scale.

9. In the art described, as claimed in claim 8, the scale having a weighing beam and a platform pivotally mounted thereon, said platform transferring the weight of the egg to the beam at the pivotal point thereon.

10. In the art described, as claimed in claim 8, the weighing scale having a weighing beam with a platform, an arm extending downwardly from the platform and having a counter-weight, and a pivotal connection between the arm and the weighing beam.

11. An egg sizing machine having a frame with side rails at an inclination, a track divided into a plurality of sections, weighing scales and drop panels positioned between said sections, the scales and the panels having rails, an endless conveyer having slats in the upper run of the conveyor, the slats following the inclination of the said rails, the tracks on the scales being downwardly inclined to allow an egg to roll ahead of the slat moving the egg, and electro-magnetic means interconnecting the scales and the dropping panels to actuate said panels, only by eggs of sufficient weight to actuate the scales.

12. An egg sizing machine, as claimed in claim 11, a feeding table having an endless belt thereon, means to operate the belt at a higher speed than the conveyor, the conveyor receiving eggs at the end of the infeeding belt.

13. An egg sizing machine having a sizing table with a plurality of weighing scales and dropping panels, means to interconnect a scale and a dropping panel adjacent thereto to drop eggs by movement of the panels only when such egg is of sufficient weight to actuate the scale associated with such panel, a receptacle for the dropped eggs comprising an endless apron, and means to move said apron transverse to the axial line of the sizing table.

14. In an egg sizing machine, a weighing scale having a beam, a dropping panel positioned to receive an egg after passing off the scale, a trigger connected to the panel, a sear engaging the trigger and holding the panel inoperative, an electro-magnet, a circuit through such magnet operated by movement of the beam due to the weight of an egg to close the circuit, and means actuated by the energizing of the magnet to release the trigger from the sear and allow dropping of the panel.

15. In a sizing machine, a weighing scale having a beam mounted on a fulcrum, a platform having an arm extending downwardly therefrom with a counter-weight on the end of the arm, tracks on the scale to allow rolling of an egg, and a pivotal connection between the arm and the beam.

16. In a sizing machine, as claimed in claim 15, a pivotally mounted drop panel positioned adjacent the discharge end of the scale, a trigger connected to the panel, a sear engaging the trigger, an electro-magnet positioned to attract the sear when energized, an electric circuit including the magnet and contacts closed by the movement of the weighing beam, a bumper spring to release the trigger from the sear on the attraction of the sear by the magnet, and a second spring to return the panel to its original position after dumping.

17. An article grading machine comprising a structure with means to move articles therealong one by one, a scale over which the articles are passed, a dropping panel distinct from the scale and receiving the articles after moving off the scale, and means interconnected between the scale and the dropping panel to drop the articles therethrough if of sufficient weight to actuate the scale.

18. An article grading machine comprising in combination a structure having means to move articles therealong, a weighing scale over which said articles are passed, a dropping panel beyond the scale, a bridging plate between the scale and the panel, and means interconnected between the scale and the dropping panel to drop an article therethrough if of sufficient weight to actuate the scale, the said bridging plate being sufficient to assure the article being completely removed from the scale before bearing on the dropping panel.

19. An article grading machine comprising in combination an elongated structure having a scale adapted to receive such articles one by one, a dropping device spaced from the scale, an electro-mechanical interconnecting means between the scale and the dropping device to drop an article if of sufficient weight to actuate the scale, the dropping device and the scale being relatively positioned whereby the article is completely off the scale before coming on the dropping device.

20. A method of grading articles by weight comprising moving such articles in a certain direction one by one, weighing each article separate, and subsequent to weighing and in a separate procedure therefrom diverting an article of sufficient weight.

21. A method of grading articles by weight comprising moving such articles in succession in a predetermined path, weighing the articles one by one and subsequent to weighing and in a distinct and separate operation from the weighing separating first the heaviest articles from the path of travel, and weighing the succeeding articles and diverting the articles of successively lesser weight in succession and in the same manner as the first diverted articles.

22. A method of grading articles by weight comprising moving said articles one by one in a predetermined path, passing the articles successively over a plurality of weighing scales, and if an article is of sufficient weight and after complete removal from the scale dropping said article from the path of travel in an operation distinct from the weighing, the first scale being adapted to weigh the heaviest articles and the next scale to weigh succeedingly lighter articles.

In testimony whereof I have signed my name to this specification.

JOHN W. WYLAND.